Dec. 13, 1938.   J. W. HALE   2,140,155
CHANGE SPEED DEVICE
Filed July 23, 1936   2 Sheets-Sheet 2
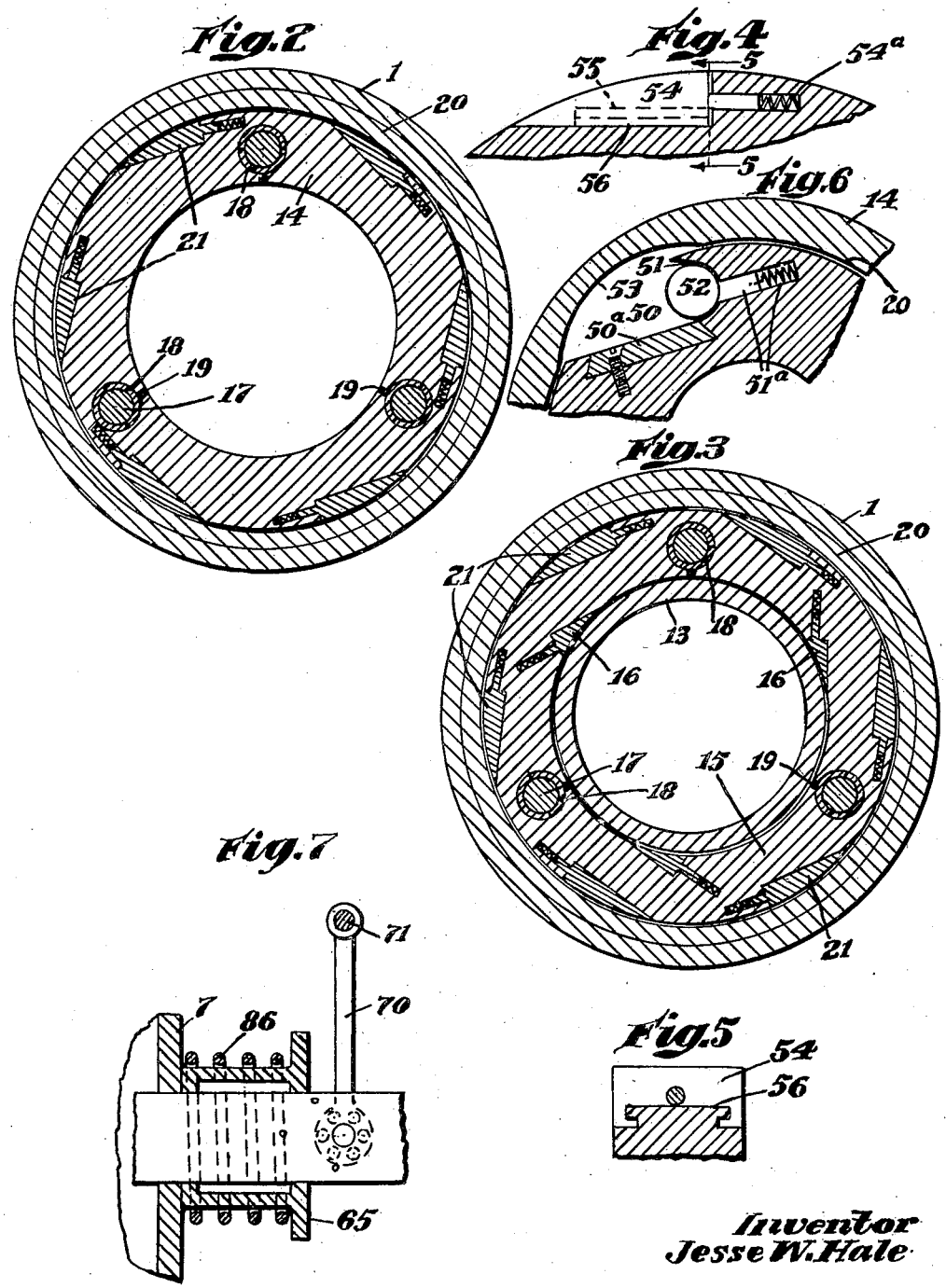
Inventor
Jesse W. Hale
By Ellis Spear Jr.
Attorney Patented Dec. 13, 1938

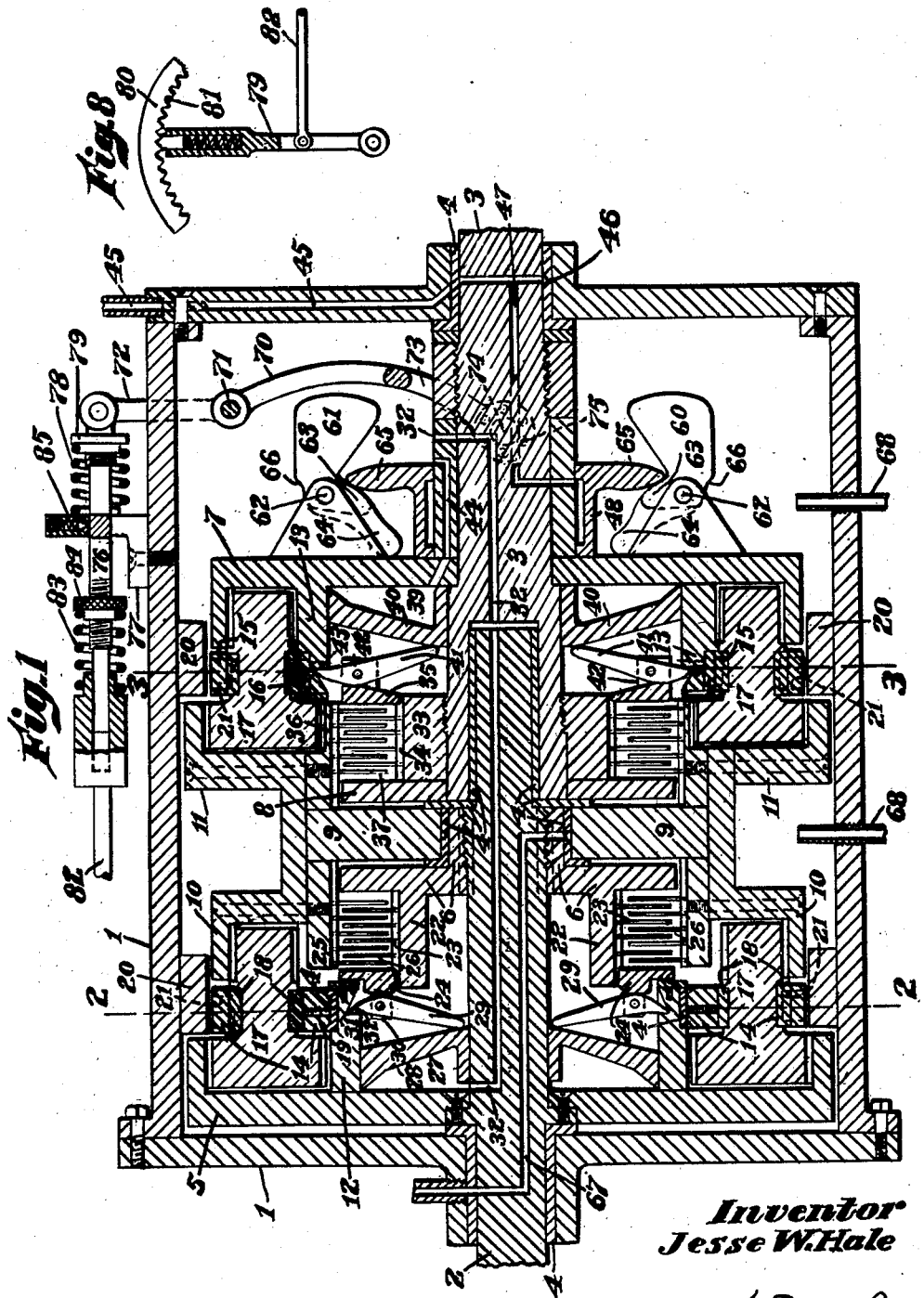

2,140,155

UNITED STATES PATENT OFFICE 2,140,155

CHANGE SPEED DEVICE

Jesse W. Hale, Newton Center, Mass.

Application July 23, 1936, Serial No. 92,083

17 Claims. (Cl. 74—260).

My present invention relates to improvements in change speed devices.

The many uses to which automatic change speed devices are adapted has directed much attention to the typical problems involved.

In this invention, I follow somewhat my co-pending application, Serial No. 66,995, filed March 4, 1936, particularly in the use of fluid pressure as the actuating means. The connection of the drive and driven shafts is different in that an independently rotatable member is interposed between those shafts. The independently rotatable member is adapted to be connected to each of the shafts by an idler assembly or by a clutch, which assembly and clutches are so arranged that engagement of a clutch renders the assembly inoperative.

While, as above stated, my present invention follows my co-pending application, Serial No. 66,995, filed March 4, 1936, in the use of fluid pressure as the actuating means, I utilize levers to ensure the engagement of the clutches, while other novel features of the controls of the fluid pressure will be apparent as the accompanying drawings and specification are considered.

In general, my present invention provides an automatic change speed device that is relatively simple in construction and particularly effective due to its durability and flexibility in use.

In the drawings I have shown a typical embodiment of my invention in which its application to automobiles is shown as illustrating certain typical and desirable requirements of such devices.

In the drawings:

Fig. 1 is a sectional view of my invention.

Fig. 2 is a fragmentary view of Fig. 1 along the lines 2—2 of Fig. 1.

Fig. 3 is a view similar to Fig. 2 along the lines 3—3 of Fig. 1.

Fig. 4 is an enlarged view of the one way brake shown in Figs. 2 and 3.

Fig. 5 is a view of the brake shown in Fig. 4 along the lines 5—5.

Fig. 6 is a view of another type of one way brake that may be used in place of that shown in Fig. 4.

Fig. 7 is a fragmentary view of a modified form of fluid pressure control, and

Fig. 8 is a view of one form of manual control.

In my invention, I use a casing 1 which is apertured to receive the drive shaft 2 and the driven shaft 3. The driven shaft 3 receives the end of the shaft 2 and bushings 4 are provided between the shafts and the shafts and the casing.

In order to simplify the drawings, I have made no attempt to show details of construction which are employed to aid assembly of the various parts except where such details might not be readily apparent to those skilled in the art.

The drive shaft 2 carries a rim gear 5 having internal teeth and a flange 6 while the driven shaft 3 carries a similar gear 7 and a flange 8. The flanges 6 and 8 when provided with suitable bushings 4 define a recess to receive an independently rotatable member 9.

In accordance with my invention, connection of the drive saft 2 and the driven shaft 3 is effected only through the member 9 which is formed to provide a rim gear 10 facing the rim gear 5 and a rim gear 11 facing the rim gear 7. While other types of gears may be employed, the use of rim gears with internal teeth is preferred.

An annular flange 12 is mounted on the inner face of the gear 5 while a similar flange 13 is secured to the gear 7. A ring 14 including a bushing 4 is rotatably mounted on the flange 12 while a ring 15 is rotatably mounted on the flange 13. One way brakes 16 are provided to lock the ring 15 to the flange 13 if the ring 15 tends to rotate in the same direction as the drive shaft 2 but faster than the driven shaft 3 for reasons that will be apparent.

The rings 14 and 15 are provided with a plurality of apertures adapted to receive the small end of a step gear 17 and a split bushing 18, which bushing 18 may be locked in desired position by the set screws 19.

I mount rings 20 on the inner surface of the casing 1 over the rings 14 and 15 and one way brakes generally indicated at 21 in Fig. 1 are provided to lock the rings 14 and 15 thereto to prevent rotation thereof counter to rotation of the drive shaft 2.

For purposes of illustration, it may be assumed that the gears 5, 17, and 10 are effective to establish a ratio of rotation of the shaft 2 and the member 9 of 2 to 1, and that the gears 11, 17, and 7 establish a like rotation between the member 9 and the shaft 3 so that from the structure thus far described, the ratio between the drive and driven shafts is at a 4 to 1 ratio or a suitable low speed drive. Increasing ratios may, of course, also be utilized if desired.

The flange 6 of the drive shaft 2 is provided with an annular bracket 22 on which are slidably mounted clutch plates 23 and a slidable head plate 24. The member 9 is provided with a like bracket 25 on which are slidably mounted clutch plates 26.

The flange 12 defines a cylinder 27 carried by the drive shaft 2 for a piston 28 mounted on the drive shaft 2, which piston is in contact with one end of a lever 29 which is confined between keepers 30 on the clutch head 24 and fulcrumed as at 31 in the flange 12. A fluid conduit 32 extends from the cylinder 27 through the shafts 2 and 3 to the surface of the driven shaft 3 rearwardly of the gear 7.

An essentially similar arrangement to that just described is used to interlock the member 9 and the driven shaft 3. Specifically, a collar 33 on the driven shaft 3 carries slidable clutch plates 34 and a head 35 backed by the flange 8, while an annular bracket 36 of the member 9 carries slidable clutch plates 37.

The flange 13 defines a cylinder 39 for the piston 40 which is in contact with one end of a lever 41 which bears against the clutch head 35 between keepers 42 and which lever 41 is fulcrumed at 43 in the flange 13. A fluid conduit 44 extends from the cylinder 39 through the driven shaft 3 to the surface thereof.

From a source of fluid pressure (such as a lubrication pressure system not shown) fluid is admitted through the conduit 45 to an enclosed circular groove 46 on the driven shaft 3 which is connected to a conduit 47 through the shaft 3 to the surface thereof inside a slide valve 48 on the shaft 3. The conduit 44 is adapted to be connected to the conduit 47 on rearward movement of the valve 48, while further sliding movement of the valve 48 also connects the conduit 32.

When fluid under pressure is admitted to the cylinder 40 the clutch members 34 and 37 are carried into engagement to lock the member 9 and the shaft 3 together rendering the gear connections 11, 17, and 7 inoperative so that the ratio between the shafts 2 and 3 is determined by the gears 5, 17, and 10, which on the assumed basis is 2 to 1 or a suitable second speed drive. When fluid under pressure is admitted to the cylinder 27, the clutch members 23 and 26 are engaged locking the shaft 2 and the member 9 together which renders the gears 5, 17, and 10 inoperative effecting a direct or high speed drive.

It will be noted that the use of levers 29 and 41 is of importance in ensuring proper engagement of the clutches which are of a capacity consistent with allowable driving torque and that the elimination of the idler assemblies as direct drive is effected greatly reduces the wear of the gears.

The one way brakes 21 merit special attention for it will be appreciated that in second and high speeds one or both of the rings 16 are rotated and the clutch members are subjected to centrifugal force. To meet this condition, I have shown in Figs. 4 and 6, two types of one way brakes.

The form shown in Fig. 6 is of the roller type. The recess 50 in the ring 14 includes a wear plate 50ª, and a pocket 51 which confines the rollers 52 by reason of their inertia when the ring 14 is rotated in the same direction as the drive shaft 2. Springs and push pins are indicated at 51ª. Preferably, the inner surface of the ring 20 is provided with scollops 53.

The form shown in Fig. 4 employs blocks 54 of conventional friction clutch material. The blocks 54 are slidably confined on a flanged rib 55 on the bottom of the recess 56 and are under the influence of a spring 54ª and are likewise restrained from contact by inertia when rotating in the same direction as the drive shaft.

To effect gear ratio changes, I use a plurality of sets of governors 60 and 61. These governors are pivotally mounted as at 62 to the rear face of the gear 7 and include arms 63 and 64 adapted to contact the flange 65 of the slide valve 48 to slide said valve to connect the conduits 32 and 44 to the conduit 47 as and for the purpose previously described.

As shown in Fig. 1, the flange 65 is formed with a surface to effect a camming action when contacted by the arms 63 and 64 of the governors 60 and 61 respectively.

The arms 63 and 64 vary in length, the arms 63 being shorter, and are both cam shaped. A stop indicated at 66 limits the action of the governors 60 while the end portion of the arm 64 are formed to effect a definite thrust sufficient to slide the valve 48 to connect the conduit 32. By this construction, while the valve 48 is constantly under the influence of the governors, relatively definite thrusts of the governors are effected at definite speeds of the driven shaft 3 to permit the flow of the fluid under pressure to be correctly controlled. The arms 63 and 64 of the governors 60 and 61 respectively act in parallel to effect the low to second ratio change while the arms 63 and governors 61 act alone to effect the second to high speed ratio change.

I have provided a second conduit 67 to carry oil under pressure to the bushing 4 between the drive shaft 2 and the independently rotatable member 9 to ensure proper lubrication of my device. Suitable outlets are indicated at 68 which ensure the maintenance of an adequate oil level and permit an excess of oil to return to its source.

In my earlier invention of which may be taken as an example my co-pending application, Serial No. 66,995, filed March 4, 1936, I utilized a compressible member to oppose the action of the governor and means controlled by the operator to vary the effectiveness of said compressible member as desired.

In my present invention, I utilize a lever 70 which is actuated by turning a shaft 71 extending through the casing 1, which shaft is rotated by a lever 72. The lever 70 includes a fork portion 73 straddling the shaft 3, which portion 73 includes studs 74 on which are mounted bearing members 75 in contact with the rear edge of the valve 48.

A rod 76 is shown as slidably mounted in a guide 77 on the casing 1 and connected to the lever 72. A spring 78 is confined between the guide 77 and the nut 79 on the rod 76 which permits the tension of the spring 78 to be varied to resist the action of the governor as desired.

While any basis of control by the operator may be selected as desired, such as the hand operated lever 79 movable with reference to the arc 80 and interlocked by detents indicated at 81 (see Fig. 8), which control may be mounted on a steering wheel, the operator control includes a rod 82 connected to the rod 76 by means of a spring 83, the tension of which may be varied by adjusting the nut 84 on the rod 76.

It will be noted that in my co-pending application the tension on the governor is increased by compression of same.

In my present invention the manually controlled tension is in parallel with the fixed tension.

The guide 77 is bored to receive the detent 75 device 85 while the rod 76 is provided with three notches to cooperate therewith in eliminating any hunting of the valve 48.

In Fig. 7, I have shown a modification of the control of the fluid pressures in which the governors are replaced by a spring 86 which constantly urges the valve 48 against the resistance of the spring 78 and the operator controls.

My invention is particularly effective for all purposes to which change speed devices are adaptable due to its simple, but durable construction, and the positiveness and flexibility of its operation.

What I therefore claim and desire to secure by Letters Patent is:—

1. In a change speed device, a drive shaft, a driven shaft, and an intermediate rotatable member, idler assemblies connecting said member to said shafts, means to hold said assemblies against retrograde rotation, a clutch adapted to interlock said member and said driven shaft, a clutch adapted to interlock said member and said drive shaft, and means to effect engagement of said clutches.

2. In a change speed device, a drive shaft, a driven shaft, and an intermediate rotatable member, idler assemblies connecting said member to said shafts, means to hold said assemblies against retrograde rotation, a clutch adapted to interlock said member and said driven shaft, a clutch adapted to interlock said member and said drive shaft, fluid pressure operated means to effect engagement of said clutches.

3. In a change speed device, a drive shaft, a driven shaft, and an intermediate rotatable member, idler assemblies connecting said member to said shafts, means to hold said assemblies against retrograde rotation, a clutch adapted to interlock said member and said driven shaft, a clutch adapted to interlock said member and said drive shaft, fluid pressure operated means to effect engagement of said clutches, a valve in control of said fluid, a governor responsive to the speed of the driven shaft to actuate said valve, and operator controlled means to vary the action of said governor.

4. In a change speed device, a drive shaft, a driven shaft, and an intermediate rotatable member, idler assemblies connecting said member to said shafts, means to hold said assemblies against retrograde rotation, a clutch adapted to interlock said member and said driven shaft, a clutch adapted to interlock said member and said drive shaft, fluid pressure operated means to effect engagement of said clutches, a valve in control of said fluid, means to actuate said valve and operator controlled means to vary the action of said valve actuating means.

5. In a change speed device, a drive shaft, a driven shaft, an intermediate rotatable member, idler assemblies connecting said member to said shafts, clutch members slidably carried by said rotatable member and by said shafts, a concentric cylinder mounted on each of said shafts, a piston in each cylinder, a lever mounted in each of said cylinders to be actuated by said piston and to slide said clutch members into engagement, a valve slidably mounted on said driven shaft, a source of fluid pressure in communication with said valve through said driven shaft, and a conduit to said driven shaft cylinder through said driven shaft and a conduit to said driving shaft cylinder through said driving and driven shafts, and means to slide said valve to effect communication between first said conduit and said driven shaft cylinder and then between both of said conduits.

6. In a change speed device, a casing, a driving shaft, a driven shaft and an intermediate rotatable member, gear connections between said member and said shafts, each of said gear connections including an idler step gear, a ring carrying said idler gears, and means to hold said ring against retrograde movement, said means comprising one way brakes disposed to lock said rings to said casing, clutches adapted to lock said rotatable member to said shafts, said one way brakes including means to hold the interlocking means inoperative when said rings are rotated with said shafts.

7. In a change speed device, a casing, a driving shaft, a driven shaft and an intermediate rotatable member, gear connections between said member and said shafts, each of said gear connections including an idler step gear, a ring carrying said idler gears, and means to hold said ring against retrograde movement, said means comprising one way brakes disposed to lock said rings to said casing, clutches adapted to lock said rotatable member to said shafts, said one way brakes including means to hold the interlocking means inoperative when said rings are rotated with said shafts and one way brakes adapted to lock said ring to said driven shaft against rotation faster than that of said driven shaft.

8. In a device as claimed in claim 3 in which the operator controlled means comprise a member opposing the action of said governor, a slidable rod pivoted to said member, a compressible member resisting sliding movement of said rod caused by said governor and detent means to hold the rod to prevent hunting of said governor.

9. In a device as claimed in claim 3 in which the operator controlled means comprise a member opposing the action of said governor, a slidable rod pivoted to said member, a compressible member resisting sliding movement of said rod caused by said governor and detent means to hold the rod to prevent hunting of said governor, and means to vary the effectiveness of said compressible member.

10. In a device as claimed in claim 3 in which the operator controlled means comprise a member opposing the action of said governor, a slidable rod pivoted to said member, a compressible member resisting sliding movement of said rod caused by said governor and detent means to prevent hunting of said governor, a slidable member adapted to be actuated by the operator, and a compressible member connecting said last named slidable member and said rod.

11. In a device as claimed in claim 3 in which the operator controlled means comprise a member opposing the action of said governor, a slidable rod pivoted to said member, a compressible member resisting sliding movement of said rod caused by said governor and detent means to hold the rod to prevent hunting of said governor, and means to vary the effectiveness of said compressible member.

12. In a change speed device, a drive shaft, a driven shaft, and an intermediate rotatable member, idler assemblies connecting said member to said shafts, means to hold said assemblies against retrograde rotation, a clutch adapted to interlock said member and said drive shaft, a clutch adapted to interlock said member and said driven shaft, means to effect engagement of said clutches, and speed responsive means in control of said means effecting clutch engagement.

13. In a change speed device, a drive shaft, a driven shaft, and an intermediate rotatable member, idler assemblies connecting said member to said shafts, means to hold said assemblies against retrograde rotation, a clutch adapted to interlock said member and said drive shaft, a clutch adapted to interlock said member and said driven shaft, means to effect engagement of said clutches, speed responsive means in control of said means effecting clutch engagement, and an operator control to oppose the action of said speed responsive means.

14. In a change speed device, a drive shaft, a driven shaft, and an intermediate rotatable member, idler assemblies connecting said member to said shafts, means to hold said assemblies against retrograde rotation, a clutch adapted to interlock said member and said drive shaft, a clutch adapted to interlock said member and said driven shaft, means to effect engagement of said clutches, speed responsive means in control of said means effecting clutch engagement, and an adjustable operator control to oppose the action of said speed responsive means.

15. In a change speed device, a drive shaft, a driven shaft, and an intermediate rotatable member, idler assemblies connecting said member to said shafts, means to hold said assemblies against retrograde rotation, a clutch adapted to interlock said member and said drive shaft, a clutch adapted to interlock said member and said driven shaft, means to effect engagement of said clutches, speed responsive means in control of said means effecting clutch engagement, and an operator control to oppose the action of said speed responsive means, and said operator control including a resilient coupling.

16. In a change speed device, a drive shaft, a driven shaft, and an intermediate rotatable member, idler assemblies connecting said member to said shafts, means to hold said assemblies against retrograde rotation, a clutch adapted to interlock said member and said drive shaft, a clutch adapted to interlock said member and said driven shaft, means to effect engagement of said clutches, speed responsive means in control of said means effecting clutch engagement, an operator control to oppose the action of said speed responsive means, said operator control including a resilient coupling, and detent means to hold said control to prevent hunting of said speed responsive means.

17. In a change speed device, a drive shaft, a driven shaft, and an intermediate rotatable member, idler assemblies connecting said member to said shafts, means to hold said assemblies against retrograde rotation, a clutch adapted to lock said member to said drive shaft, a clutch adapted to lock said member to said driven shaft, means to effect engagement of said clutches, said means including a slidable member, and speed responsive means to move said slidable member, said speed responsive means comprising two sets of weighted arms, one of said arms being adapted to move said slidable member further than the other of said sets to effect successive movements of said slidable member at predetermined speeds.

JESSE W. HALE.